United States Patent [19]
Muraji et al.

[11] Patent Number: 5,073,826
[45] Date of Patent: Dec. 17, 1991

[54] VIDEO SIGNAL TRANSMISSION APPARATUS FOR FRAMES WITH AN ODD NUMBER OF LINES

[75] Inventors: Tsutomu Muraji, Nara; Akihiro Takeuchi, Ikoma; Atsuo Ochi, Osaka, all of Japan

[73] Assignee: Matsushita Electric Industrial Co., Ltd., Japan

[21] Appl. No.: 326,834

[22] Filed: Mar. 21, 1989

[30] Foreign Application Priority Data

Mar. 22, 1988 [JP] Japan ................................ 63-68551

[51] Int. Cl.$^5$ ............................................. H04N 5/76
[52] U.S. Cl. .................................. 358/335; 358/327; 358/340; 358/310; 360/61
[58] Field of Search ............... 358/310, 327, 335, 328, 358/181, 336, 340; 360/7, 8, 9.1, 22, 61, 33.1

[56] References Cited

U.S. PATENT DOCUMENTS

| | | | |
|---|---|---|---|
| 4,811,117 | 3/1989 | Morioka et al. | 358/310 |
| 4,811,199 | 3/1989 | Kobayashi et al. | 358/328 |
| 4,864,424 | 9/1989 | Ochi et al. | 358/328 |
| 4,873,583 | 10/1989 | Kobayashi et al. | 358/310 |

Primary Examiner—Robert L. Richardson
Attorney, Agent, or Firm—Lowe, Price, LeBlanc & Becker

[57] ABSTRACT

Two-channel signals contain information of a video signal in a video system where one frame is composed of an odd number of lines. A first switching device periodically and mutually switches the two-channel signals at periods of nH and thereby generates two converted signals which correspond periodically and alternately to the two-channel signals at periods of nH. The character "nH" denotes a vlaue which equals a preset integer "n" times a horizontal sync period "H". The first switching device is reset for each of a plurality of fields. The two converted signals are transmitted through a transmission system. A second switching device periodically and mutually switches the two converted signals, which are transmitted through the transmission system, at periods of nH and thereby reobtains two-channel signals from the two converted signals. The second switching device is reset for each of the fields.

18 Claims, 10 Drawing Sheets

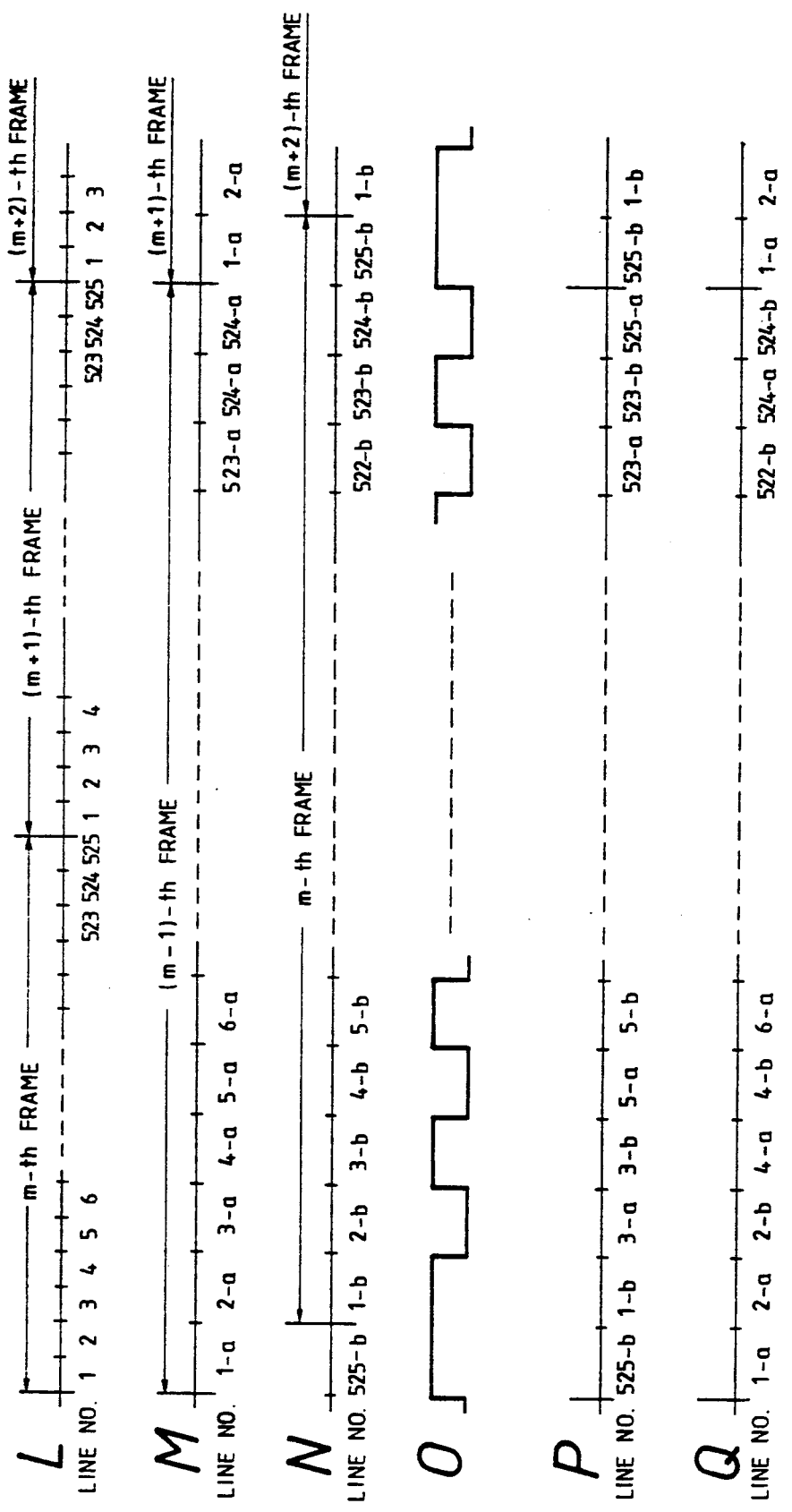

VIDEO SIGNAL TRANSMISSION APPARATUS FOR FRAMES WITH AN ODD NUMBER OF LINES

BACKGROUND OF THE INVENTION

This invention relates to a video signal transmission apparatus for television broadcasting systems, video tape recorders, and others.

Some video cassette recorders (VCR) for broadcasting use or business use are designed to record two-channel component video signals including a luminance signal and a time-base compressed color signal respectively.

U.S. patent application Ser. No. 890,347 filed on July 7, 1986, now U.S. Pat. No. 4,811,119, discloses a VCR in which two-channel component video signals are periodically and mutually changed or switched at given periods of nH ("H" denotes a horizontal sync period; "n" denotes an arbitrary integer) before they are recorded. A similar signal-switching process is performed during the reproduction of recorded signals. When two-channel component video signals reproduced from this VCR are visualized on a television receiver screen, the displaced pictures are susceptible to unwanted phenomena such as flickers and dot crawling since a luminance difference and a time difference of 30 Hz or 25 Hz tends to occur between the same scanning lines of two successive frames.

Japanese Published Unexamined Patent Application 62-29381 discloses an advanced two-channel video signal transmission apparatus for a recording and reproducing system which removes a luminance difference and a time difference of 30 Hz or 25 Hz from the same scanning lines and thus which suppresses flickers and dot crawling in reproduced pictures. In the video signal transmission apparatus of Japanese Application 62-29381, one line is lost for each frame which generally has 525 lines. The lost video information is restored through an interpolation process.

SUMMARY OF THE INVENTION

It is an object of this invention to provide an excellent video signal transmission apparatus.

In a video signal transmission apparatus of this invention, two-channel signals contain information of a video signal in a video system where one frame is composed of an odd number of lines. A first switching device periodically and mutually switches the two-channel signals at periods of nH and thereby generates two converted signals which correspond periodically and alternately to the two-channel signals at periods of nH. The character "nH" denotes a value which equals a preset integer "n" times a horizontal sync period "H". The first switching device is reset for each field of the frame. The two converted signals are transmitted through a transmission system. A second switching device periodically and mutually switches the two converted signals, which are transmitted through the transmission system, at periods of nH and thereby reobtains two-channel signals from the two converted signals. The second switching device is reset for each of the fields.

BRIEF DESCRIPTION OF THE DRAWINGS

FIGS. 11(l) through 11(q) are timing diagrams of various signals in the apparatus of FIG. 8.

DESCRIPTION OF THE FIRST PREFERRED EMBODIMENT

Figure 1:
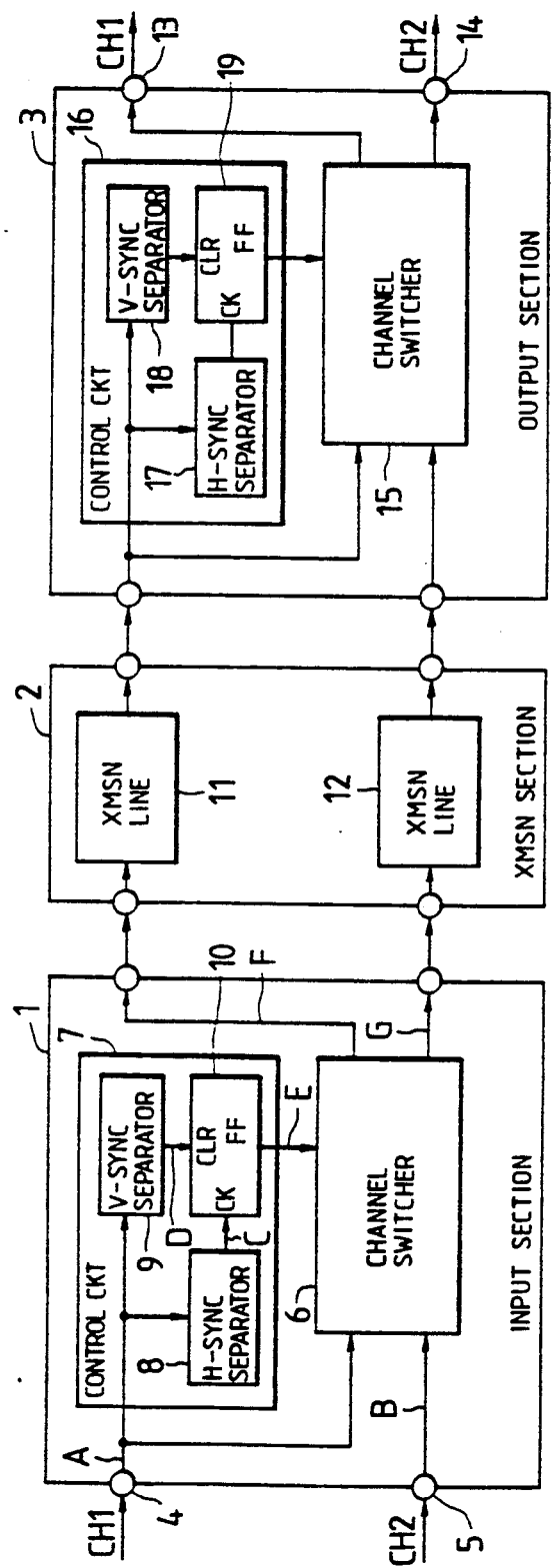
FIG. 1 is a block diagram of a video signal transmission apparatus according to a first embodiment of this invention.

With reference to FIG. 1, a video signal transmission apparatus of a first embodiment of this invention includes an input section 1, a transmission section 2, and an output section 3. The transmission section 2 is connected between the input section 1 and the output section 3.

The input section 1 has a pair of input terminals 4 and 5 for a first channel CH1 and a second channel CH2 respectively.

For example, in the case of video signals of a line interlacing (2:1) system where one frame is composed of an odd number of lines, the input terminals 4 and 5 are subjected to a luminance signal and a time-base compressed multiplexed color signal respectively. The luminance signal and the time-base compressed multiplexed color signal constitute two-channel component video signals respectively. The time-base compressed multiplexed color signal is also referred to as the color signal.

Figure 4:
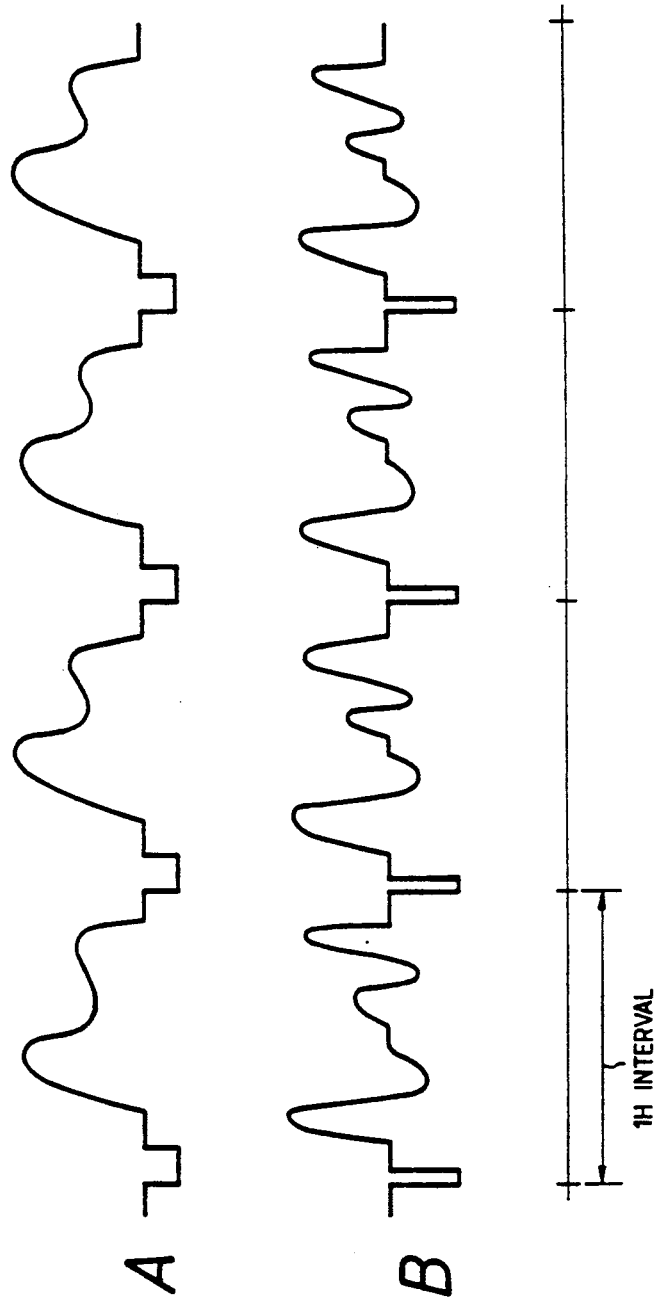
FIG. 4, consisting of A and B, is a diagram of the waveforms of a luminance signal and a color signal in the apparatus of FIG. 1.

During an interval containing some horizontal sync periods, the luminance signal has a waveform as shown by A of FIG. 4 while the time-base compressed multiplexed color signal has a waveform as shown by B of FIG. 4. During a vertical blanking period in an odd field, the luminance signal has a waveform as shown by A of FIG. 5. During a vertical blanking period in an even field, the luminance signal has a waveform as shown by A of FIG. 6. During a vertical blanking period in an odd field, the time-base compressed multiplexed color signal has a waveform as shown by B of FIG. 5. During a vertical blanking period in an even field, the time-base compressed multiplexed color signal has a waveform as shown by B of FIG. 6.

The luminance signal A is inputted into a first channel switcher 6 and a first control circuit 7 via the input terminal 4. The first control circuit 7 includes a horizontal sync signal separator 8 which extracts a horizontal sync signal from the input luminance signal A. The horizontal sync signal has a waveform as shown by C of FIG. 5 or FIG. 6. The first control circuit 7 also includes a vertical sync signal separator 9 which extracts a vertical sync signal from the input luminance signal A. The vertical sync signal has a waveform as shown by D of FIG. 5 or FIG. 6. The horizontal sync signal C and the vertical sync signal D are respectively applied to a clock terminal CK and a clear terminal CLR of a flip-flop (FF) 10 within the first control circuit 7. The flip-flop 10 generates a control signal in response to the input horizontal and vertical sync signals. The control signal which is outputted from the flip-flop 10 has a waveform as shown by E of FIG. 5 or FIG. 6. This control signal E is fed to the first channel switcher 6.

As described previously, the luminance signal is inputted into the first channel switcher 6 via the input terminal 4. The time-base compressed multiplexed color signal is inputted into the first channel switcher 6 via the input terminal 5.

Figure 2:
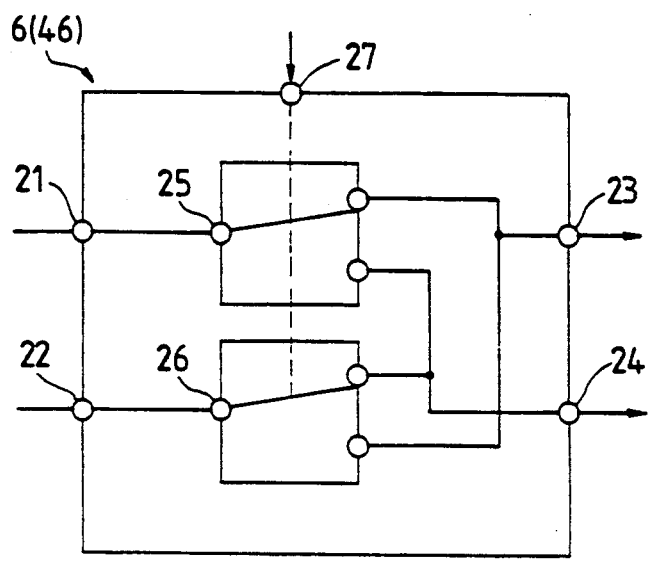
FIG. 2 is a diagram of the channel switchers of FIG. 1.

As shown in FIG. 2, the first channel switcher 6 includes input terminals 21 and 22 subjected to the luminance signal A and the color signal B respectively. The first channel switcher 6 also includes switches 25 and 26 connected between the input terminals 21 and 22 and output terminals 23 and 24. The switches 25 and 26 are controlled by the control signal E which is fed from the first control circuit 7 via a control terminal 27. The switch 25 periodically and selectively transmits the luminance signal A to either the output terminal 23 or the output terminal 24 in response to the control signal E. The switch 26 periodically and selectively transmits the color signal B to either the output terminal 23 or the output terminal 24 in response to the control signal E. The pair of the switches 25 and 26 function to periodically and mutually change or switch the luminance signal A and the color signal B at intervals of one horizontal sync period in response to the control signal E.

Specifically, the luminance signal A which corresponds to odd lines of odd fields is transmitted to the output terminal 23. The luminance signal A which corresponds to even lines of even fields is transmitted to the output terminal 23. The luminance signal A which corresponds to even lines of odd fields is transmitted to the output terminal 24. The luminance signal A which corresponds to odd lines of even fields is transmitted to the output terminal 24.

The color signal B which corresponds to odd lines of odd fields is transmitted to the output terminal 24. The color signal B which corresponds to even lines of even fields is transmitted to the output terminal 24. The color signal B which corresponds to even lines of odd fields is transmitted to the output terminal 23. The color signal B which corresponds to odd lines of even fields is transmitted to the output terminal 23.

Figure 5:
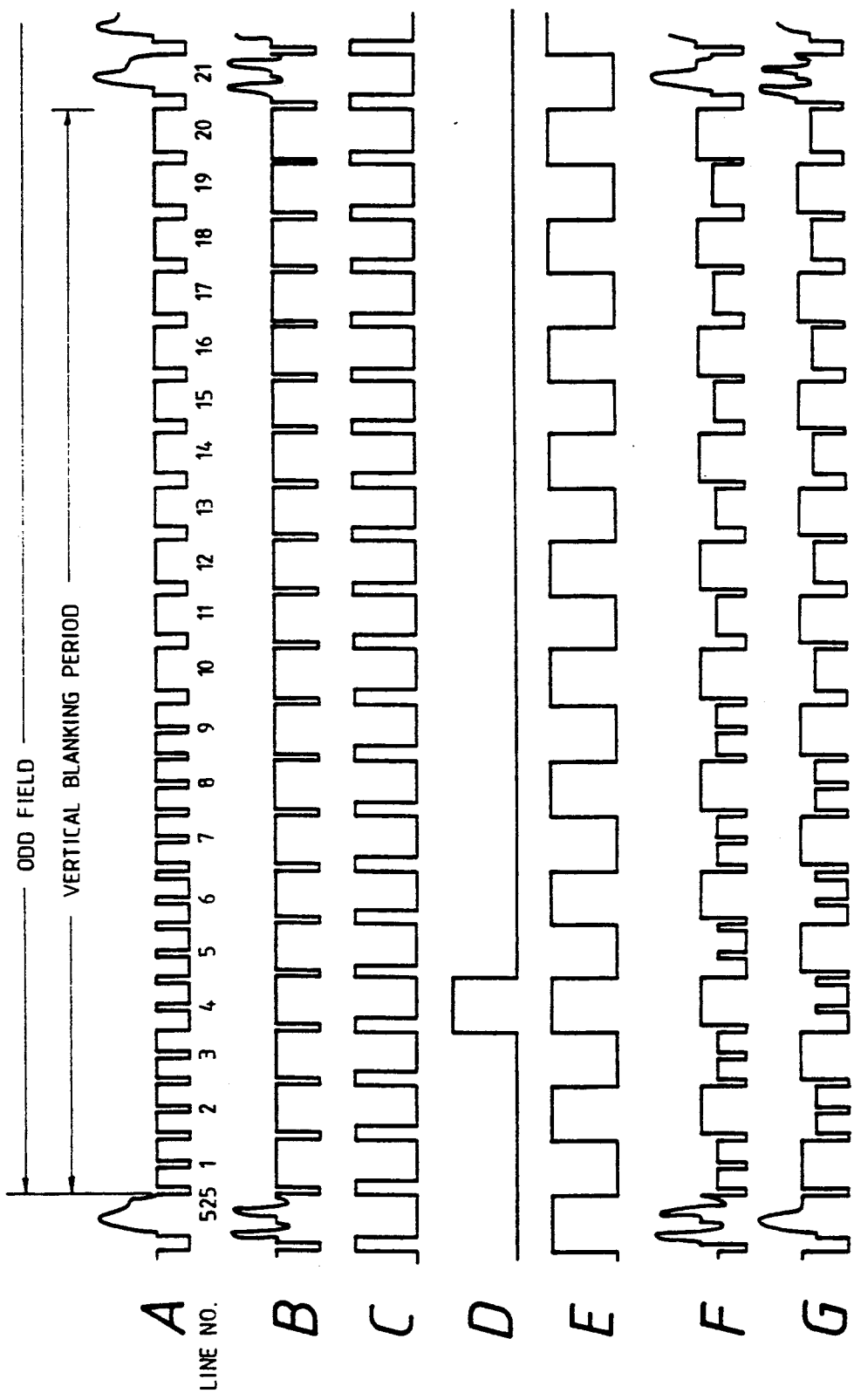
FIG. 5, consisting of A-G, is a timing diagram of various signals in the apparatus of FIG. 1.
Figure 6:
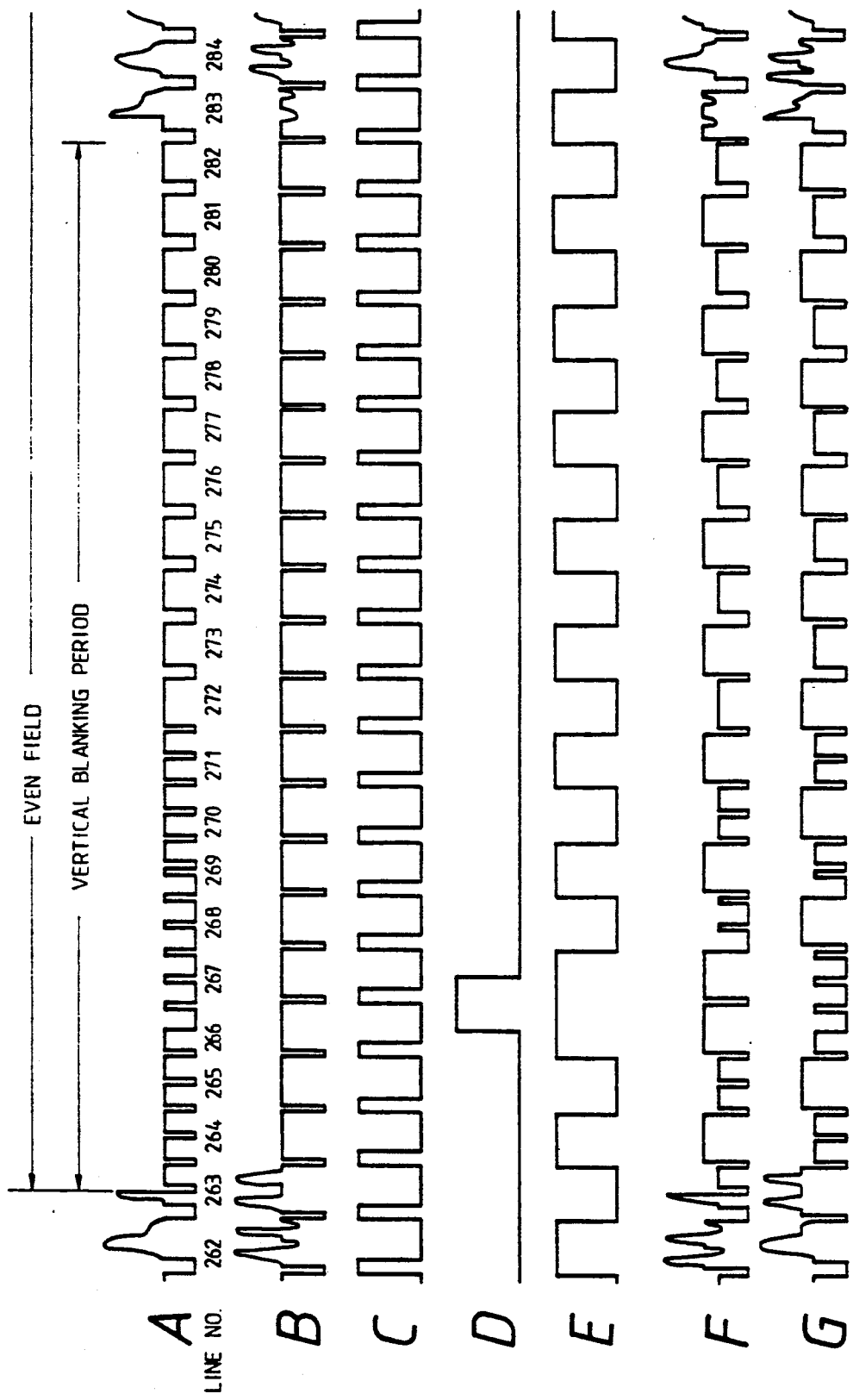
FIG. 6, consisting of A-G, is a timing diagram of various signals in the apparatus of FIG. 1.

As shown by F of FIG. 5 or FIG. 6, the signal which appears at the output terminal 23 is periodically changed between two states corresponding to the luminance signal A and the color signal B at 1 H periods, where the character "H" denotes one horizontal sync period. As shown by G of FIG. 5 or FIG. 6, the signal which appears at the output terminal 24 is periodically changed between two states corresponding to the luminance signal A and the color signal B at 1 H periods in a manner opposite to the state change of the signal F. In this way, two-channel mutually-switched video signals F and G are obtained at the output terminals 23 and 24 respectively. The switched video signals F and G are outputted from the input section 1 to the signal transmission section 2.

The signal transmission section 2 includes separate transmission lines 11 and 12 for transmitting the video signals F and G respectively. As will be made clear hereinafter, the transmission lines 11 and 12 include respective electromagnetic conversion systems such as magnetic recording and reproducing devices.

Figure 3:
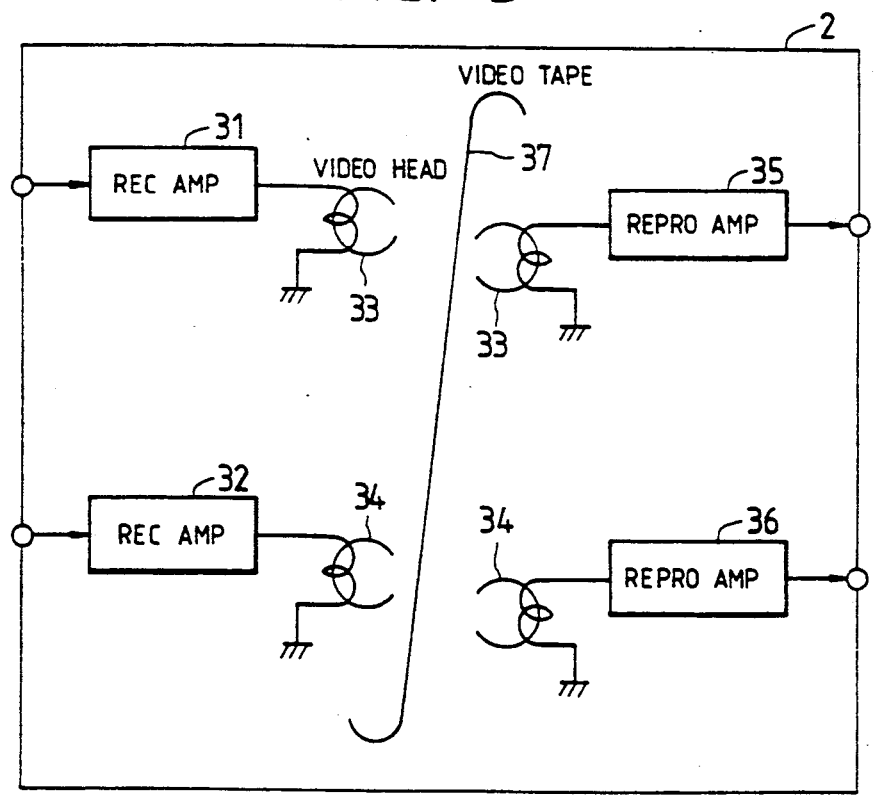
FIG. 3 is a diagram of the transmission section of FIG. 1.

As shown in FIG. 3, the transmission section 2 includes a first video head 33 receiving the switched video signal F via a recording amplifier 31. The switched video signal F is recorded by the first video head 33 on a magnetic tape 37. The transmission section 2 also includes a second video head 34 receiving the switched video signal G via a recording amplifier 32. The switched video signal G is recorded by the second video head 34 on the magnetic tape 37.

During a playback process, the first video head 33 reproduces a video signal F from the magnetic tape 37 while the second video head 34 reproduces a video signal G from the magnetic tape 37. The reproduced video signals F and G are outputted from the transmission section 2 via reproducing amplifiers 35 and 36 respectively.

The output section 3 receives the reproduced video signals F and G from the transmission section 2. The output section 3 includes a second channel switcher 15 and a second control circuit 16. The second channel switcher 15 receives both of the reproduced video signals F and G. The second control circuit 16 receives the reproduced video signal F.

The second control circuit 16 includes a horizontal sync signal separator 17 which extracts a horizontal sync signal from the input video signal F. The second control circuit 16 also includes a vertical sync signal separator 18 which extracts a vertical sync signal from the input video signal F. The horizontal sync signal and the vertical sync signal are respectively applied to a clock terminal CK and a clear terminal CLR of a flip-flop (FF) 19 within the second control circuit 16. The flip-flop 19 generates a control signal in response to the input horizontal and vertical sync signals. The control signal which is outputted from the flip-flop 19 has a waveform as shown by E of FIG. 5 or FIG. 6. This control signal E is fed to the second channel switcher 15.

As described previously, both of the reproduced video signals F and G are inputted into the second channel switcher 15. The structure of the second channel switcher 15 is similar to the structure of the first channel switcher 6. A pair of internal switches of the second channel switcher 15 function to periodically and mutually change or switch the input video signals F and G at intervals of one horizontal sync period in response to the control signal from the second control circuit 16, thereby reobtaining a luminance signal A and a color signal B on the basis of the video signals F and G. The second channel switcher 15 applies the luminance signal A and the color signal B to output terminals 13 and 14 for the first and second channels CH1 and CH2 respectively.

A description will now be made on conditions of pictures on a television receiver screen which are formed in accordance with component video signals transmitted via the video signal transmission apparatus of this embodiment.

Figure 7:
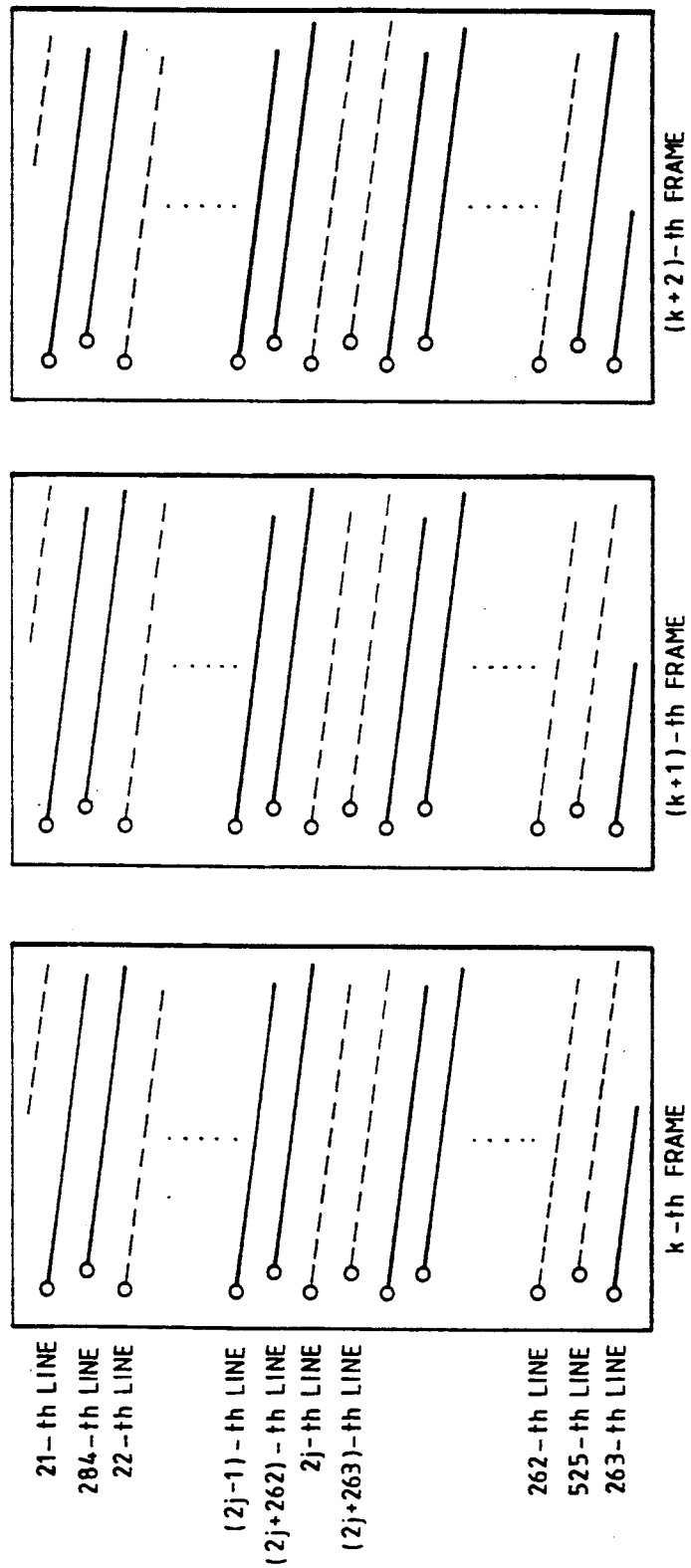
FIG. 7 is a diagram showing conditions of a television receiver screen visualizing the video signals transmitted by the apparatus of FIG. 1.

Firstly, a description concerning a luminance signal will be made. With reference to FIG. 7, it is now assumed that the luminance signal corresponding to the $(2j-1)$-th line of the k-th frame is transmitted via the transmission line 11 of the transmission section 2. The characters "j" and "k" denote integers. The luminance signal corresponding to the (2j)-th line of the k-th frame is transmitted via the transmission line 12 of the transmission section 2. The luminance signal corresponding to the (2j+262)-th line of the k-th frame, the (2j−1)-th line of the (k+1)-th frame, and the (2j+262)-th line of the (k+1)-th frame is transmitted via the transmission line 11. The luminance signal corresponding to the (2j+263)-th line of the k-th frame, the (2j)-th line of the (k+1)-th frame, and the (2j+263)-th line of the (k+1)-th frame is transmitted via the transmission line 12. In this way, the portions of the luminance signal which correspond to the same lines of successive frames are transmitted via the same transmission line, that is, the same electromagnetic conversion system, of the transmission section 2.

Similarly, the portions of the color signal which correspond to the same lines of successive frames are transmitted via the same transmission line, that is, the same electromagnetic conversion system, of the transmission section 2.

Accordingly, the same lines of successive frames represent the respective portions of the video signals which are transmitted via the same transmission line of the transmission section 2. In other words, the same lines of successive frames will not represent the of the video signals which portions are transmitted via the different transmission lines of the transmission section 2. Therefore, the video signal transmission apparatus of this embodiment prevents a level difference and a gain difference between the same lines of successive frames which would cause a luminance difference or a time difference of 30 Hz (or 25 Hz) and thus which would cause flickers and dot crawling in displayed pictures. Furthermore, in the video signal transmission apparatus of this embodiment, the video signals of all lines can be completely indicated on the television receiver screen.

DESCRIPTION OF THE SECOND PREFERRED EMBODIMENT

Figure 8:
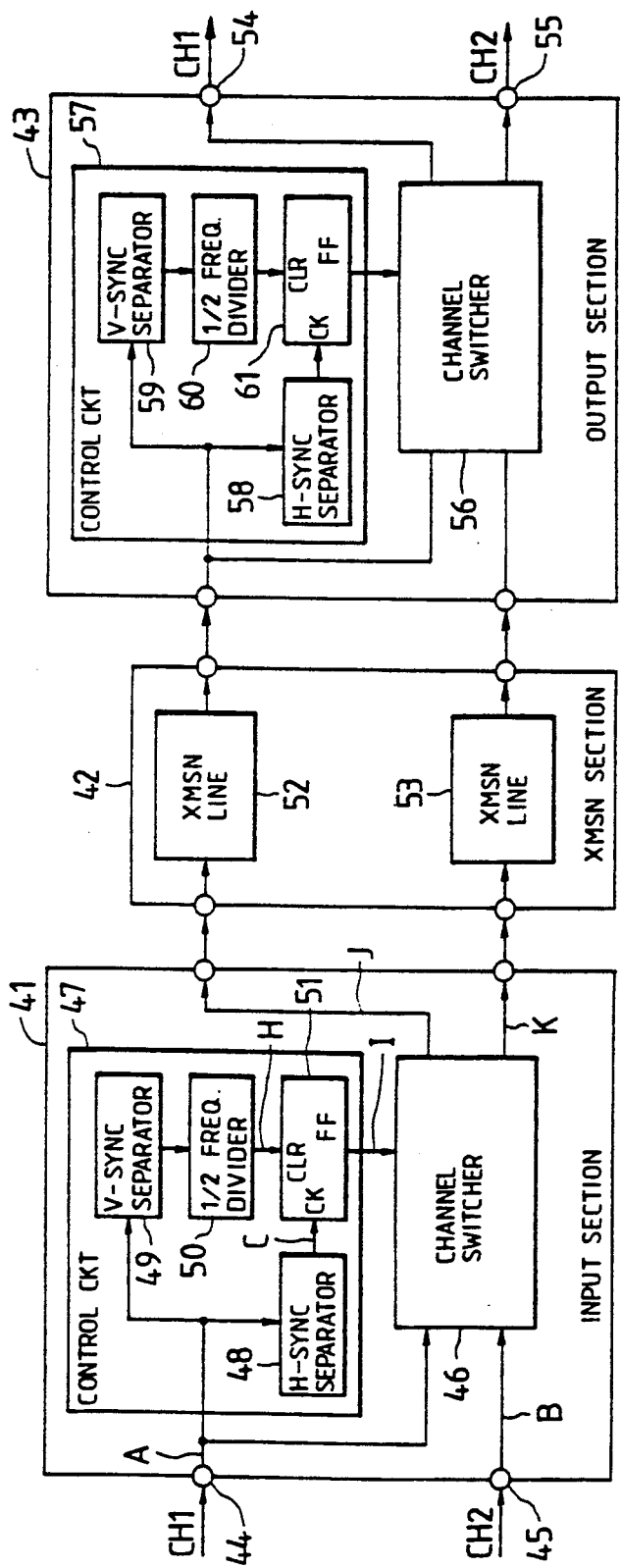
FIG. 8 is a block diagram of a video signal transmission apparatus according to a second embodiment of this invention.

With reference to FIG. 8, a video signal transmission apparatus of a second embodiment of this invention includes an input section 41, a transmission section 42, and an output section 43. The transmission section 42 is connected between the input section 41 and the output section 43.

The input section 41 has a pair of input terminals 44 and 45 for a first channel CH1 and a second channel CH2 respectively.

For example, in the case of video signals of a line interlacing (2:1) system where one frame is composed of an odd number of lines, the input terminals 44 and 45 are subjected to a luminance signal and a time-base compressed multiplexed color signal respectively. The luminance signal and the time-base compressed multiplexed color signal constitute two-channel component video signals respectively. The time-base compressed multiplexed color signal is also referred to as the color signal.

Figure 9:
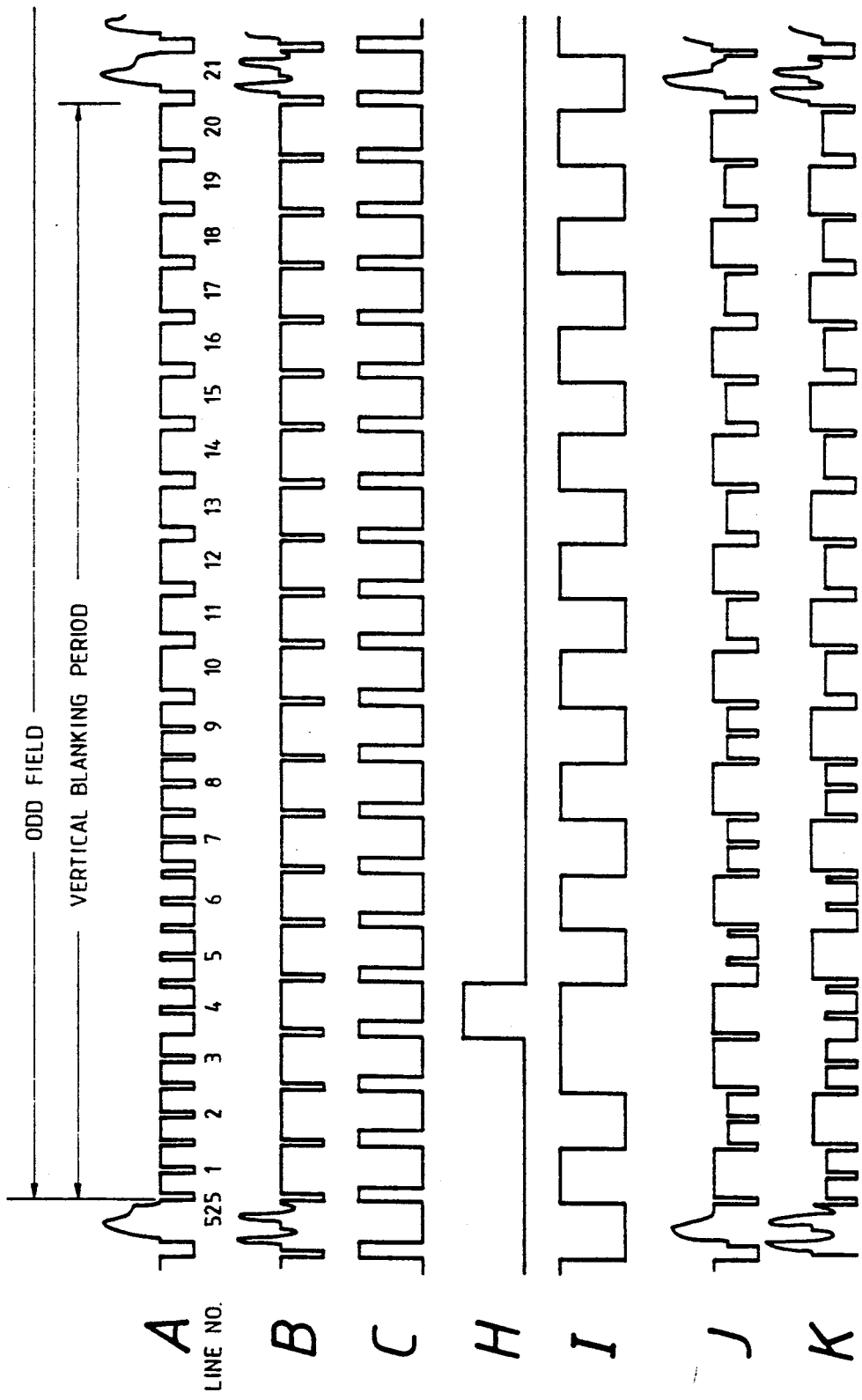
FIGS. 9(a) through 9(c) and FIGS. 9(h) through 9(k) are timing diagrams of various signals in the apparatus of FIG. 8.

During a vertical blanking period in an odd field, the luminance signal has a waveform as shown by A of FIG. 9 while the time-base compressed multiplexed color signal has a waveform as shown by B of FIG. 9.

The luminance signal A is inputted into a first channel switcher 46 and a first control circuit 47 via the input terminal 44. The first control circuit 47 includes a horizontal sync signal separator 48 which extracts a horizontal sync signal from the input luminance signal A. The horizontal sync signal has a waveform as shown by C of FIG. 9. The horizontal sync signal C is applied to a clock terminal CK of a flip-flop 51 within the first control circuit 47. The first control circuit 47 also includes a vertical sync signal separator 49 which extracts a vertical sync signal from the input luminance signal A. A ½ frequency divider 50 down-converts the vertical sync signal into a signal which has a waveform as shown by H of FIG. 9 and which has a frequency equal to a half of the frequency of the vertical sync signal. The output signal H from the frequency divider 50 is applied to a clear terminal CLR of the flip-flop 51. The flip-flop 51 generates a control signal in response to the horizontal sync signal C and the output signal H from the frequency divider 50. The control signal which is outputted from the flip-flop 51 has a waveform as shown by I of FIG. 9. This control signal I is fed to the first channel switcher 46.

As described previously, the luminance signal A is inputted into the first channel switcher 46 via the input terminal 44. The time-base compressed multiplexed color signal B is inputted into the first channel switcher 46 via the input terminal 45.

The first channel switcher 46 has an internal structure similar to that shown in FIG. 2. The first channel switcher 46 includes input terminals 21 and 22 subjected to the luminance signal A and the color signal B respectively. The first channel switcher 46 also includes switches 25 and 26 connected between the input terminals 21 and 22 and output terminals 23 and 24. The switches 25 and 26 are controlled by the control signal I which is fed from the first control circuit 47 via a control terminal 27. The switch 25 periodically and selectively transmits the luminance signal A to either the output terminal 23 or the output terminal 24 in response to the control signal I. The switch 26 selectively transmits the color signal B to either the output terminal 23 or the output terminal 24 in response to the control signal I. The pair of the switches 25 and 26 function to periodically and mutually change or switch the luminance signal A and the color signal B at intervals of one horizontal sync period in response to the control signal I.

Specifically, the luminance signal A which corresponds to odd lines is transmitted to the output terminal 23. The luminance signal A which corresponds to even lines is transmitted to the output terminal 24. The color signal B which corresponds to odd lines is transmitted to the output terminal 23. The color signal B which corresponds to even lines is transmitted to the output terminal 24.

As shown by J of FIG. 9, the signal which appears at the output terminal 23 is periodically changed between two states corresponding to the luminance signal A and the color signal B at 1 H periods, where the character "H" denotes one horizontal sync period. As shown by K of FIG. 9, the signal which appears at the output terminal 24 is periodically changed between two states corresponding to the luminance signal A and the color signal B at 1 H periods in a manner opposite to the state change of the signal J. In this way, two-channel mutually-switched video signals J and K are obtained at the output terminals 23 and 24 respectively. The switched video signals K and J are outputted from the input section 41 to the signal transmission section 42.

The signal transmission section 42 includes separate transmission lines 52 and 53 for transmitting the video signals J and K respectively. As in the embodiment of FIGS. 1-7, the transmission lines 52 and 53 include respective electromagnetic conversion systems such as magnetic recording and reproducing devices.

The output section 43 receives the video signals J and K from the transmission section 42. The output section 43 includes a second channel switcher 56 and a second control circuit 57. The second channel switcher 56 receives both of the video signals J and K. The second control circuit 57 receives the video signal J.

The second control circuit 57 includes a horizontal sync signal separator 58 which extracts a horizontal sync signal from the input video signal J. The horizontal sync signal is applied to a clock terminal CK of a flip-flop 61 within the second control circuit 57. The second control circuit 57 also includes a vertical sync signal separator 59 which extracts a vertical sync signal from the input video signal J. A ½ frequency divider 60 down-converts the vertical sync signal into a signal which has a frequency equal to a half of the frequency of the vertical sync signal. The output signal from the frequency divider 60 is applied to a clear terminal CLR of the flip-flop 61. The flip-flop 61 generates a control signal in response to the horizontal sync signal and the output signal from the frequency divider 60. The control signal which is outputted from the flip-flop 61 is applied to the second channel switcher 56.

As described previously, both of the video signals J and K are inputted into the second channel switcher 56. The structure of the second channel switcher 56 is similar to the structure of the first channel switcher 46. A pair of internal switches of the second channel switcher 56 function to periodically and mutually change or switch the input video signals J and K at intervals of one horizontal sync period in response to the control signal from the control circuit 57, thereby reobtaining a luminance signal A and a color signal B on the basis of the video signals J and K. The second channel switcher 56 applies the luminance signal A and the color signal B to output terminals 54 and 55 for the first and second channels CH1 and CH2 respectively.

A description will now be made on conditions of pictures on a television receiver screen which are formed in accordance with component video signals transmitted via the video signal transmission apparatus of this embodiment.

Figure 10:
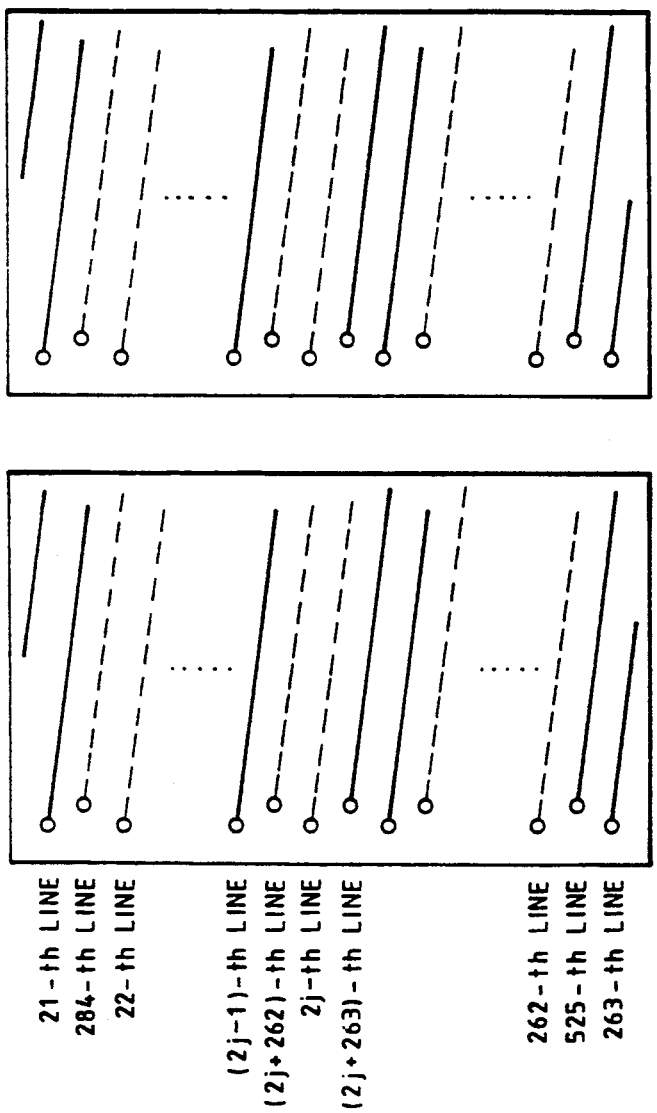
FIG. 10 is a diagram showing conditions of a television receiver screen visualizing the video signals transmitted by the apparatus of FIG. 8.

Firstly, a description concerning a luminance signal will be made. With reference to FIG. 10, it is now assumed that the luminance signal corresponding to the (2j−1)-th line of the k-th frame is transmitted via the transmission line 52 of the transmission section 42. The characters "j" and "k" denote integers. The luminance signal corresponding to the (2j)-th line of the k-th frame is transmitted via the transmission line 53 of the transmission section 42. The luminance signal corresponding to the (2j+263)-th line of the k-th frame, the (2j−1)-th line of the (k+1)-th frame, and the (2j+263)-th line of the (k+1)-th frame is transmitted via the transmission line 52. The luminance signal corresponding to the (2j+262)-th line of the k-th frame, the (2j)-th line of the (k+1)-th frame, and the (2j+262)-th line of the (k+1)-th frame is transmitted via the transmission line 53. In this way, the portions of the luminance signal which correspond to the same lines of successive frames are transmitted via the same transmission line, that is, the same electromagnetic conversion system, of the transmission section 42.

Similarly, the portions of the color signal which correspond to the same lines of successive frames are transmitted via the same transmission line, that is, the same electromagnetic conversion system, of the transmission section 42.

In cases where a video signal is expanded so that the time base of the video signal is twice as long as the time base of a normal video signal, the video signal transmission apparatus of this embodiment operates as follows.

With reference to FIG. 11, the character L denotes a video signal in a television system where one frame is composed of 525 lines. The video signal L is expanded in time base by a factor of 2 and is periodically divided into expanded video signals M and N at one-frame periods. The expanded video signals M and N are applied to the input terminals 44 and 45 respectively.

The video signal M is inputted into the first channel switcher 46 and the first control circuit 47 via the input terminal 44. The first control circuit 47 generates a control signal O on the basis of the input video signal M. This control signal O is applied to the first channel switcher 46.

As described previously, the video signal M is inputted into the first channel switcher 46 via the input terminal 44. The video signal N is inputted into the first channel switcher 46 via the input terminal 45. The first channel switcher 46 functions to periodically and mutually switch the video signals M and N at intervals of one horizontal sync period which are determined by the control signal O from the first control circuit 47.

Specifically, the video signal M which corresponds to odd lines other than the first line is transmitted to the output terminal 23. The video signal M which corresponds to even lines is transmitted to the output terminal 24. The video signal N which corresponds to odd lines is transmitted to the output terminal 23. The video signal N which corresponds to even lines is transmitted to the output terminal 24.

As shown by P of FIG. 11, the signal which appears at the output terminal 23 is periodically changed between two states corresponding to the video signals M and N at 1 H periods, where the character "H" denotes one horizontal sync period. As shown by Q of FIG. 11, the signal which appears at the output terminal 24 is periodically changed between two states corresponding to the video signals M and N at 1 H periods in a manner opposite to the state change of the signal P. In this way, two-channel mutually-switched video signals P and Q are obtained at the output terminals 23 and 24 respectively. The switched video signals P and Q are outputted from the input section 41 to the signal transmission section 42. The video signals P and Q are further transmitted to the output section 43 via the transmission lines 52 and 53 of the transmission section 42 respectively.

The second channel switcher 56 of the output section 43 receives both of the video signals P and Q. The second control circuit 57 of the output section 43 receives the video signal P. The second control circuit 57 generates a control signal on the basis of the input video signal P. The control signal which is outputted from the second control circuit 57 is fed to the second channel switcher 56.

As described previously, both of the video signals P and Q are inputted into the second channel switcher 56. The second channel switcher 56 functions to periodically and mutually change or switch the input video signals P and Q at intervals of one horizontal sync period in response to the control signal from the control circuit 57, thereby reobtaining video signals M and N on the basis of the video signals P and Q. The second channel switcher 56 applies the video signals M and N to the output terminals 54 and 55 respectively.

The video signals M and N which are outputted from the video signal transmission apparatus of this embodiment are compressed in time base by a factor of ½ and are then combined back into a normal video signal L. As understood from the previous description, the portions of the video signal L which correspond to the same lines of successive frames are transmitted via the same transmission line, that is, the same electromagnetic conversion system, of the transmission section 42. Although this fact is false for the portion of the video signal L which corresponds to the first line, the first line signal is generally unindicated on the television receiver screen and thus there occurs no problem. The video signal transmission apparatus of this embodiment has advantages similar to those of the video signal transmission apparatus of the embodiment of FIGS. 1-7.

What is claimed is:

1. A video signal transmission apparatus comprising:
   first switching means for periodically and mutually switching two-channel signals at periods of nH and thereby generating two converted signals which correspond periodically and alternately to the two-channel signals at periods of nH, wherein the two-channel signals contain video information defining a video signal in a video system where one frame is composed of an odd number of lines, and wherein the character "nH" denotes a value which equals a preset integer "n" times a horizontal sync period "H";
   first resetting means for resetting the first switching means for each field in the frame;
   means for transmitting the two converted signals;
   second switching means for periodically and mutually switching the two converted signals, which are transmitted by the transmitting means, at periods of nH and thereby reobtaining two-channel signals from the two converted signals; and
   second resetting means for resetting the second switching means for each field.

2. The apparatus of claim 1 further comprising means for resetting the first switching means for each of a plurality of frames, and means for resetting the second switching means for each of the frames.

3. The apparatus of claim 1 wherein the integer "n" equals 1.

4. The apparatus of claim 3 wherein the first switching means comprises means for extracting a horizontal sync signal from one of the two-channel signals, and means for mutually switching the two-channel signals in response to the horizontal sync signal.

5. The apparatus of claim 3 wherein the first resetting means comprises means for extracting a vertical sync signal from one of the two-channel signals, and means for resetting the first switching means in response to the vertical sync signal.

6. The apparatus of claim 3 wherein the second switching means comprises means for extracting a horizontal sync signal from one of the two converted signals, and means for mutually switching the two converted signals in response to the horizontal sync signal.

7. The apparatus of claim 3 wherein the second resetting means comprises means for extracting a vertical sync signal from one of the two converted signals, and means for resetting the second switching means in response to the vertical sync signal.

8. The apparatus of claim 1 wherein the two-channel signals comprises a luminance signal and a color signal respectively.

9. The apparatus of claim 1 wherein the transmitting means comprises means for recording and reproducing the two converted signals through an electromagnetic conversion process.

10. A video signal transmission apparatus comprising:
    first switching means for mutually switching two-channel signals, wherein the two-channel signals contain information of a video signal in a video system where one frame is composed of an odd number of lines;
    means for periodically controlling the first switching means at periods of nH and thereby generating two converted signals which correspond periodically and alternately to the two-channel signals at periods of nH, wherein the character "nH" denotes a value which equals a preset integer "n" times a horizontal sync period "H";
    means for resetting the first switching means for each field of a frame;
    means for transmitting the two converted signals;
    second switching means for mutually switching the two converted signals which are transmitted by the transmitting means;
    means for periodically controlling the second switching means at periods of nH and thereby reobtaining two-channel signals from the two converted signals; and
    means for resetting the second switching means for each field.

11. The apparatus of claim 10 further comprising means for resetting the first switching means for each of frames, and means for resetting the second switching means for each of frames.

12. In a video signal transmission apparatus including means for transmitting first and second signals in two channels, wherein said signals are transmitted in frames and lines, each frame transmitted during a frame period, each frame period having an odd number of line periods therein, and further including switching means for alternating transmission of said first and second signals for successive lines transmitted in each channel, the improvement comprising:
    timing means for causing said switching means to transmit each signal in a single channel for corresponding lines of successive frames.

13. An improved video signal transmission apparatus as recited in claim 12, wherein said timing means comprises resetting means for resetting said switching means each frame period.

14. An improved video signal transmission apparatus as recited in claim 13, wherein said resetting means comprises circuit means responsive to line sync signals and to frame sync signals, said circuit means providing a control signal to control said switching means to switch transmission in one channel between said first and second signals in sychronism with said line sync signals and for resetting said switching means in synchronism with said frame sync signals.

15. An improved video signal transmission apparatus as recited in claim 14 wherein said circuit means comprises flip flop means.

16. An improved video signal transmission apparatus as recited in claim 13, wherein each frame period includes a plurality of field periods, said frames of said signals each include a plurality of fields of lines and said signals are transmitted in fields and lines, each field transmitted during a field period, and said resetting means comprises circuit means responsive to line sync signals and to field sync signals, said circuit means providing a control signal to control said switching means to switch transmission in one channel between said first and second signals in synchronism with said line sync signals and for resetting said switching means in synchronism with said field sync signals.

17. An improved video signal transmission apparatus as recited in claim 16, wherein said means for transmitting includes first and second means for recording said signals on adjacent tracks of a recording medium so that each signal is recorded using a single one of said first and second recording means for corresponding lines of successive fields.

18. An improved video signal transmission apparatus as recited in claim 13, wherein said means for transmitting includes first and second means for recording said signals on adjacent tracks of a recording medium so that each signal is recorded using a single one of said first and second recording means for corresponding lines of successive frames.

* * * * *